United States Patent [19]
Hardy

[11] Patent Number: 5,934,335
[45] Date of Patent: Aug. 10, 1999

[54] FLEXIBLE TUBULAR PIPE WITH AN INTERNAL IMPERVIOUS POLYMERIC SHEATH

[75] Inventor: Jean Hardy, Barentin, France

[73] Assignee: Coflexip SA, France

[21] Appl. No.: 08/913,997

[22] PCT Filed: Mar. 15, 1996

[86] PCT No.: PCT/FR96/00397

§ 371 Date: Sep. 29, 1997

§ 102(e) Date: Sep. 29, 1997

[87] PCT Pub. No.: WO96/30687

PCT Pub. Date: Oct. 3, 1996

[30] Foreign Application Priority Data

Mar. 29, 1995 [FR] France .................. 95-03663

[51] Int. Cl.⁶ .................. F16L 11/16; F16L 11/08
[52] U.S. Cl. .................. 138/131; 138/134; 138/135; 138/129
[58] Field of Search .................. 138/129, 130, 138/131, 132, 133, 137, 138, 135

[56] References Cited

U.S. PATENT DOCUMENTS 3,687,169  8/1972  Reynard .................. 138/134
4,402,346  9/1983  Cheetham et al. .................. 138/129

FOREIGN PATENT DOCUMENTS

| 0 166 385 | 1/1991 | European Pat. Off. . |
| 0 446 725 | 9/1991 | European Pat. Off. . |
| 2 619 193 | 11/1989 | France . |
| 2 654 795 | 3/1992 | France . |
| WO92/00481 | 1/1992 | WIPO . |
| WO95/24579 | 9/1995 | WIPO . |

OTHER PUBLICATIONS

"Recommended Practice for Flexible Pipe", American Petroleum Institute, Jun. 1, 1988, pp. 1–37.

Primary Examiner—Patrick Brinson
Attorney, Agent, or Firm—Ostrolenk, Faber, Gerb & Soffen, LLP

[57] ABSTRACT

It is of the type comprising at least, from the interior towards the exterior, an internal non-impervious metal carcass (1), the exterior surface of which has interstices (9), an internal impervious polymeric sheath (2), a set of layers of reinforcement wires (3) (4), and an external protection sheath (5), and is characterized in that said internal impervious polymeric sheath (2) mainly comprises a thermoplastic polymer part associating at least two fluoromonomers, at least one of said fluoromonomers carrying at least one alkoxy group, the thermoplastic polymer part being blistering-resistant at a temperature of at least 130° C.

23 Claims, 2 Drawing Sheets

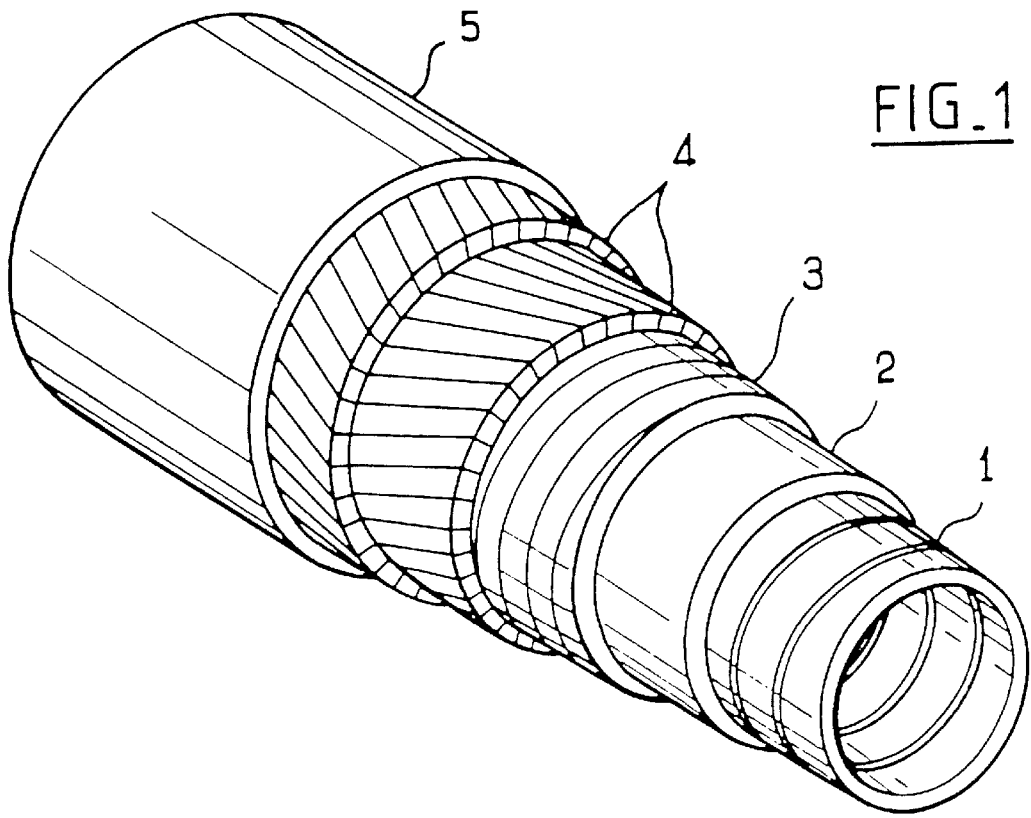
FIG_1
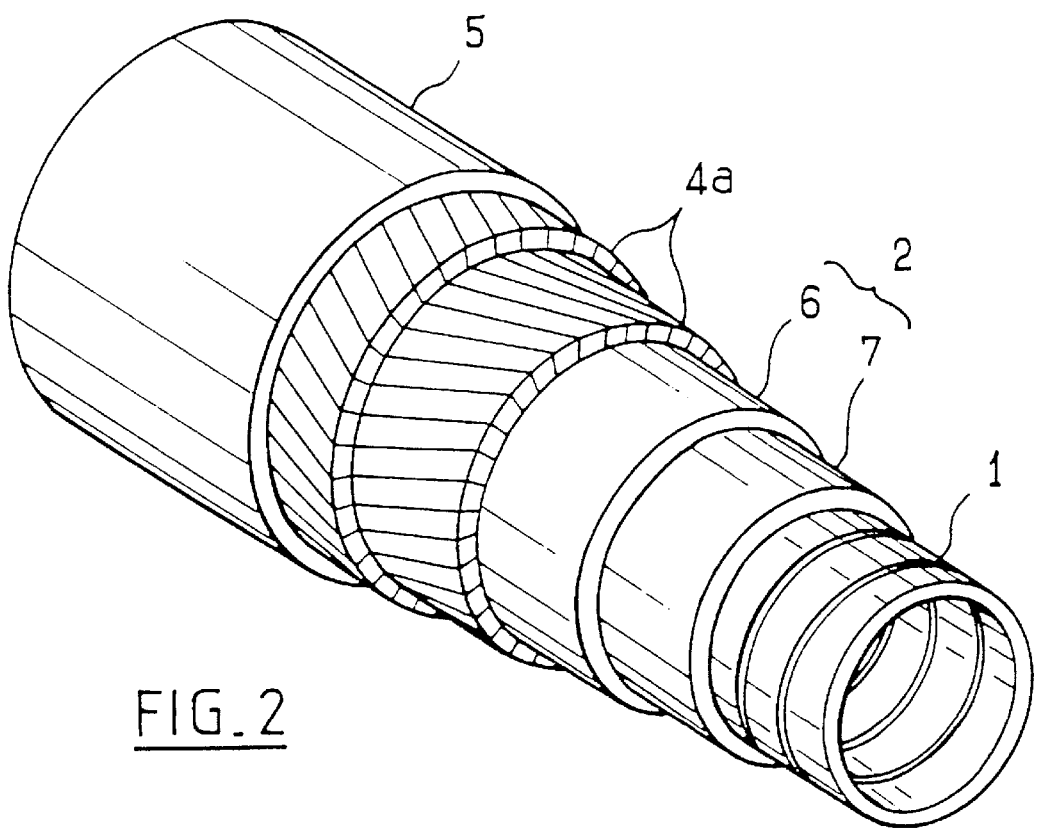
FIG_2

FLEXIBLE TUBULAR PIPE WITH AN INTERNAL IMPERVIOUS POLYMERIC SHEATH

The present invention concerns flexible tubular pipes which generally include, from the interior towards the exterior:
- a non-impervious internal flexible metal tube, called the internal carcass, comprising a helically wound profiled member with the turns clipped together, for example a clipped tape or a clipped T-section or U-section wire;
- an internal impervious sheath;
- a set of reinforcements comprising a layer of reinforcements constituting a pressure resisting member made from a close pitch helically wound T-section, Z-section or U-section wire with turns clipped together, and so-called traction reinforcement layers, each traction layer being made by helically winding wires with a lay angle less than 55°. In another variant, the set of reinforcements comprises layers with lay angles of 55° or with the lay angles complementary from one layer to another, for example a layer at 50° associated with a layer at 60°; the set of reinforcements resists the hoop stress and the axial component of the internal pressure and the axial load due to the weight of the suspended pipe and exterior effects;
- an external protection polymeric sheath.

The pipe may further comprise one or more intermediate polymeric sheaths and/or helically wound plastics material layers.

One such flexible tubular pipe is shown in FIG. 1 and described in patents FR-A-2 619 193 "Flexible Stable 4 Nappes", FR-A-2 654 795 "Onde Interne" and in "Recommended Practice for Flexible Pipe-API Recommended Practice 17B (RP17B) First Edition Jun. 1, 1988".

Because of the structure of the internal flexible metal tube, there are interstices between the winding turns that allow said internal metal tube to flex.

Many solutions have been proposed for the industrial manufacture of the internal impervious sheath. There is a trend towards the use of a polymeric material that has a low permeability to liquids and to gases, which resists the high temperatures of the fluid conveyed and which is easy to work industrially, in particular by extrusion.

The polymeric materials that have these properties are certain semi-crystalline polymers. From these, we have selected those which should be resistant to live crude with no blistering or swelling.

Certain grades of polyamide II are routinely used (products sold by ELF Atochem under the trade name RILSAN), but although this material gives excellent results it cannot be used in many cases in the most severe applications because of its limited resistance to high temperatures and its sensitivity to the presence of water. Certain grades of poly(vinylidene fluoride) (PVDF) are used for the most demanding applications. However, and going against what has previously been thought, it has been found that PVDF is not resistant to blistering above a temperature in the order of 130° to 150°. Furthermore, like other semi-crystalline polymers exhibiting relatively great shrinkage on solidification, PVDF can be subject to the risk of incipient fractures in the area of the interstice between two consecutive turns of the internal metal tube.

Consideration is now being given to the use of flexible tubular pipes for submarine petroleum production installations subject to even more severe conditions, in particular temperatures above 130° C., possibly exceeding 150° C. and even reaching at least 180° C. There is at present no satisfactory solution for such conditions.

U.S. Pat. No. 4,402,346 proposes to make the internal impervious sheath from fluroplastics materials including TEFZEL, TEFLON FEP and TEFLON PFA. It has been found that some grades of PTFE (TEFZEL from DUPONT) and of FEP (TEFLON FEP from DUPONT) can be used for the impervious sheaths of flexible tubular pipes, in particular because of their good extrudability and their resistance to high temperatures. However, it has become apparent that their resistance to blistering is insufficient at the very high temperatures with which the invention is concerned. Moreover, on the basis of the properties of PFA as they were then understood, it was logical to consider its use in the presence of petroleum at high temperatures. However, there is no mention in the above document of blistering or of the behaviour of PFA vis à vis live crude at high temperatures, in particular a temperature above 100° C. and that can reach 150° C. to 180° C. The blistering which affects the various polymers that can be used to widely varying degrees has been the subject of extensive work by the applicant subsequent to the date of the above patent, which has shown that the phenomenon in play are very complex and that, for a given polymer, it is largely impossible to predict the order of magnitude of the temperature from which it will be subject to blistering in the presence of live crude, the only way to evaluate this being to carry out very extensive tests. To remedy penetration as the result of creep into the interstices of the internal carcass and to prevent the flexibility of the pipe being reduced, it is recommended that an interleaved wrapping be formed by winding a woven glassfiber tape between the internal carcass and the PFA sheath in order to constitute a support for said PFA. It has nevertheless been found that these solutions are not satisfactory, and in particular that it is impossible in practice, in industrial manufacture, to wrap a tape without the risk of partial overlapping or of gaps between consecutive turns, which leads to marking of the PFA and to incipient fractures on flexing, and this is the case whether it is a matter of a woven glassfiber tape as described in U.S. Pat. No. 4,402,346 or a tape woven from any other fibres, or a polyester or other plastics material tape, as proposed in EP-0-166 385 for a PVDF sheath.

It has further been found that if no such wrapping is applied around the internal carcass, an external impervious sheath, which therefore bears directly on the internal carcass, is subject to unacceptable risks of cracking in the area in the vicinity of the interstices of the internal carcass if it is simply made by extruding a layer of PFA as described in U.S. Pat. No. 4,402,346.

Thermoplastics such as PEI known in themselves which retain their properties at high temperature would therefore seem to be worthy of study for application to the impervious sheaths of flexible tubular pipes, and in particular their resistance to blistering. However, their rigidity is so high that no possible solution can be seen for making the impervious sheath from any such material whilst retaining the other required qualities, whether this be by modification of the material, addition of flexibilizing agents or any other means.

An aim of the present invention is to remedy the aforementioned drawbacks and to propose an internal impervious sheath for a flexible tubular pipe that is resistant to high temperatures and to blistering.

The present invention consists in a flexible tubular pipe of the type comprising at least, from the interior towards the exterior, an internal non-impervious metal carcass, an internal impervious polymeric sheath, a set of layers of reinforcement wires, and an external protection sheath, the internal carcass comprising at least one helically wound profiled member with the turns clipped together so that at least the exterior surface of said internal carcass has interstices between consecutive turns, characterized in that said internal impervious polymeric sheath comprises a thermoplastic polymer part associating at least two fluoromonomers, at least one of said fluoromonomers carrying at least one alkoxy group, and said thermoplastic polymer part being in the form of a continuous tubular layer with no incipient fractures in the area of said interstices.

The fact of using a thermoplastic fluoro copolymer or terpolymer in accordance with the invention to make a continuous tubular structure constituting the internal impervious sheath or a main part of this sheath provides better resistance to high temperatures of live crude flowing in the flexible tubular pipe with no risk of incipient fractures in the interstices of the turns. It has been found, in particular, that a fluoropolymer of this kind has an exceptional aptitude to remain free of blistering due to the action of live crude at very high temperatures, the temperature possibly exceeding 130° C. and reaching 150° C. to 180° C. and possibly even more than 180° C.

In a first embodiment, the continuous tubular structure obtained by extruding a fluoro copolymer or terpolymer in accordance with the invention rests directly on the internal carcass.

In a second embodiment, in addition to a main part consisting of a continuous tubular layer made from a thermoplastic fluoro copolymer or terpolymer in accordance with the invention, the internal impervious sheath has an internal part resting on the internal carcass inside said continuous tubular layer made from a preferably amorphous polymer adapted to resist high temperatures.

In a first variant, the internal part constitutes a preferably continuous tubular layer extruded into place and preferably having a small thickness, in the order of 0.5 mm to 3 mm. The polymer used is an amorphous thermoplastics fluoropolymer having a creep resistance at high temperatures greater than that of the polymer in accordance with the invention used to make the tubular layer constituting the main part of the internal impervious sheath. In particular, a copolymer or a terpolymer associating TFE and another fluoromonomer, in particular a fluoro cyclic ether or a fluoro aldehyde, such as TEFLON AF from DUPONT de Nemours, can be used.

In a second variant the internal part is made from a thermoplastic or non-thermoplastic elastomer having a bending stiffness preferably less than that of the thermoplastic polymer constituting the main part of the internal impervious polymeric sheath. This elastomeric internal part can constitute a continuous envelope around the internal carcass, its internal surface possibly having a raised part penetrating partially into the interstice between two consecutive turns of the internal carcass. The elastomeric internal part is preferably not in the form of a continuous tubular layer but in the form of a band the section of which approximately fills the exterior part of the interstice between the consecutive turns of the internal carcass, this band being wound helically along the interstices. The band can therefore penetrate more or less deeply into the interstice or possibly occupy all of the free volume of the interstice.

Other features and advantages will emerge more clearly from a reading of the description of several embodiments of the invention and from the accompanying drawings, in which:

FIG. 1 is a fragmentary perspective view of a flexible tubular pipe,

FIG. 2 is a fragmentary perspective view of a pipe constituting another embodiment of the invention.

FIG. 1 shows a flexible tubular pipe comprising, from the interior towards the exterior:

Figure 3:
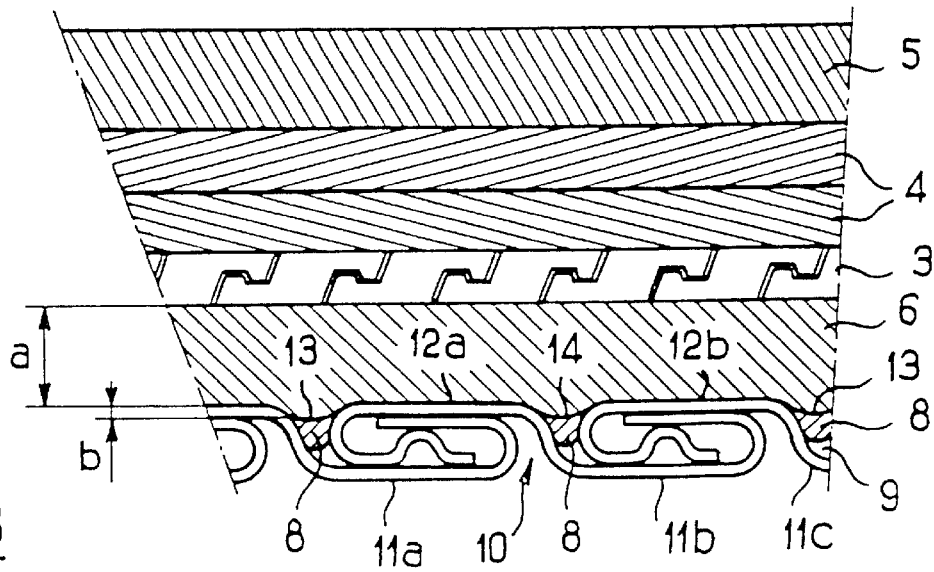
FIGS. 3, 4 and 5 are part-sectional views of other embodiments of the invention.

a flexible metal tube 1, which is not impervious, called the internal carcass, consisting of a profiled member helically wound to form turns that are clipped together, for example a clipped band or a clipped T-section or U-section wire;

an internal impervious sheath 2 the components and the structure of which are specified below and which constitutes the subject matter of the present invention;

a set of reinforcements 3, 4 comprising a pressure resisting member 3 and a layer of reinforcements 4.

The pressure resisting member 3 is made from a T-section, Z-section or U-section wire helically wound with a close pitch and with the turns clipped together, for example. The layer of reinforcements 4, called the traction layer, comprises two superposed layers formed by helically winding wires in opposite directions with a lay angle less than 55°. In another variant, the set of reinforcements comprises two layers in which the lay angles are 55° or in which the lay angles are complementary from one layer to the other, for example one layer at 55° associated with one layer at 60°. In all cases the set of reinforcements resists the hoop stress and the axial component of the forces created by the internal pressure, the axial load due to the weight of the pipe and torsion forces, in particular;

an external protection polymeric sheath 5.

In a variant (not shown) the flexible tubular pipe can comprise one or more intermediate polymeric sheaths and/or layers of plastics material wrapping.

In a first embodiment of the present invention the internal polymeric sheath 2 comprises a continuous tubular layer formed by extruding a thermoplastic copolymer or terpolymer associating at least one fluoromonomer including at least one alkoxy group with at least one other fluoromonomer.

In a first example, the sheath 2 is made from a copolymer obtained by polymerization of at least 50% and advantageously at least 70% of tetrafluoroethylene (TFE) and a perfluoro(alkyl vinyl ether) that is preferably perfluoro (propyl vinyl ether) or perfluoro(ethyl vinyl ether). Alternatively, a copolymer can be used in which the other monomer associated with the perfluoro(alkyl vinyl ether) is, in another example, a cyclic fluoromonomer, or, in another example, an anhydride fluoromonomer.

The internal impervious polymeric sheath 2 can in particular be made by extruding a material such as the product available under the tradename PFA, for example TEFLON TFA from DUPONT de Nemours, HOSTAFLON PFA from HOECHST or HYFLON PFA from AUSIMONT.

The choice of the relative proportions of the fluoromonomer carrying at least one alkoxy group and the other fluoromonomer, in particular the TFE, is optimized in accordance with the required mechanical properties. In particular, it is possible to obtain a bending stiffness greater than or equal to 50 MPa, preferably greater than or equal to 100 MPa for the maximum intended temperature of use, which temperature can be at least 130° C. and preferably at least 150° C., the bending stiffness being less than or equal to 2 500 MPa for the lowest ambient temperature envisaged, which temperature can be equal to or less than −20° C. and preferably −40° C. Likewise it is possible to obtain sufficient creep resistance when the material is subjected to the temperatures and to the pressures imposed by the fluid conveyed.

In another example, the fluoropolymer constituting the sheath is a terpolymer associating, in addition to a fluoromonomer carrying at least one alkoxy group and at least 50% of another fluoro monomer, a third, preferably fluoromonomer, preferably in a small amount, advantageously less than 10%. The third monomer is preferably vinylidene fluoride (VF2) or, in another example, chlorotrifluorethylene (CTFE).

In another variant the polymer constituting the sheath 2 is a terpolymer associating TFE and two fluoromonomers each carrying at least one alkoxy group.

In the cases described hereinabove of using a terpolymer, the presence of a third monomer, although minor, can facilitate optimizing the properties of the material in the conditions of use, in particular its mechanical properties.

In another variant, the polymer constituting the impervious sheath 2 is a copolymer or a terpolymer including at least one cyclic ether.

The copolymer or terpolymer constituting the sheath 2 is of the semi-crystalline type, the amorphous phase being relatively minor or relatively major. Alternatively, the polymer can be practically amorphous.

In one embodiment of the invention, the fluoro copolymer or terpolymer is crosslinked and has a crystalinity close to the crystalinity of the non-crosslinked state, the crosslinking being operative in the amorphous phase. Alternatively, the polymer being crosslinked, it has a crystalinity reduced relative to that for the non-crosslinked state.

In another embodiment shown in FIG. 2 the internal impervious polymeric sheath 2 has two parts, a main exterior part 6 made from a copolymer or terpolymer in accordance with the invention and forming a continuous tubular layer of substantially constant thickness, and an internal part 7 also constituting a preferably continuous tubular layer enveloping the internal carcass on which it bears. The thickness of this internal tubular layer 7 is preferably relatively small, less than the thickness of the exterior layer 6 constituting the main part of the sheath 2, and is between 0.5 mm and 3 mm. The material constituting the internal tubular layer 7 is advantageously an amorphous thermoplastic polymer, preferably an amorphous fluoropolymer having a high creep resistance, in particular a thermoplastic copolymer or terpolymer associating at least TFE with at least one other fluoromonomer, in particular a cyclic fluoro ether or a fluoro aldehyde. One example of a material of this kind is TEFLON AF from DUPONT de Nemours. The internal surface of the internal layer 7 can have an enlargement penetrating into the interstices of the internal carcass, preferably to a small extent.

Alternatively, the material constituting the internal tubular layer 7 is a thermoplastic or non-thermoplastic elastomer having a relative low bending stiffness, less than the bending stiffness of the polymer constituting the tubular layer 6. In this case, the internal surface of the layer 7 has raised portions following the helical configuration of the interstices of the internal carcass and penetrating into these interstices to a greater or lesser depth.

The flexible tubular pipe from FIG. 2 does not have any layer of reinforcements of the pressure resisting member type like the layer 3 from FIG. 1. The set of reinforcements comprises two layers of reinforcements 4a, the wires of the two layers being wound in opposite directions with angles such that the structure is in equilibrium, for example applied at 55°.

Figure 4:
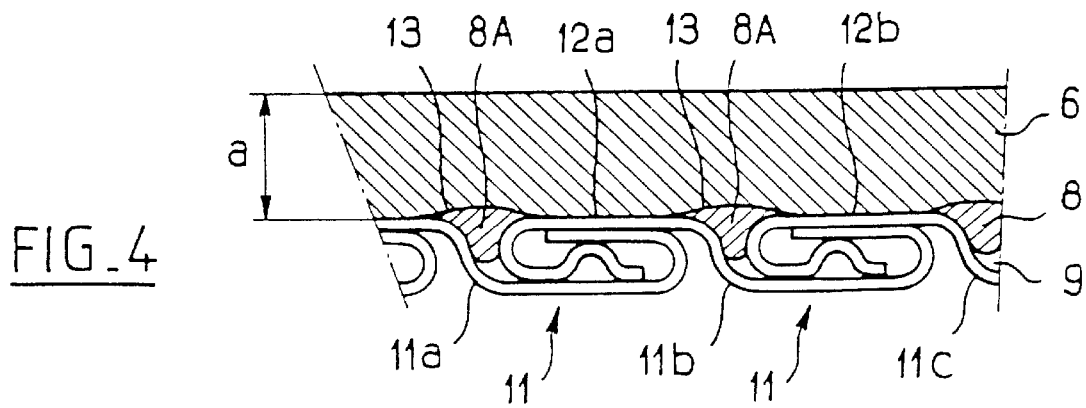
Figure 5:
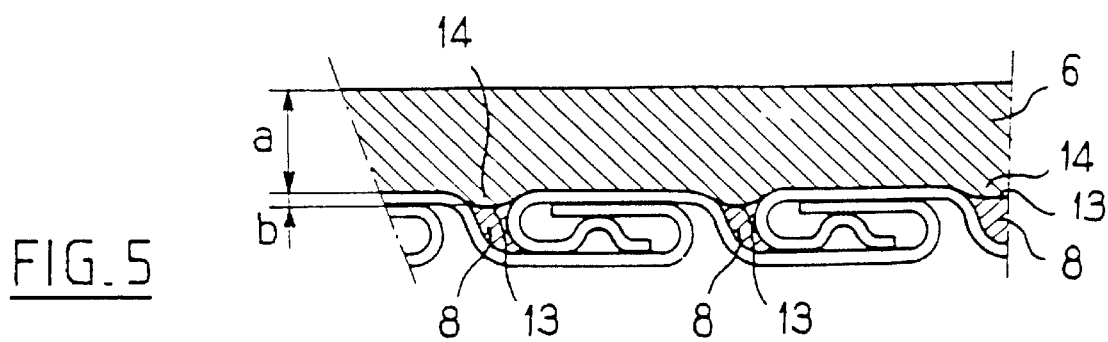

In another embodiment corresponding to the example shown in FIGS. 3, 4 and 5, the internal impervious polymeric sheath 2 also has two parts:
   a main part constituting a continuous tubular layer 6 as in FIG. 2, also made from a polymer in accordance with the invention; and
   an internal part consisting of a band 8 wound helically along the interstices 9 of the internal carcass 1 and penetrating into the interstices to a greater or lesser depth, possibly completely.

The internal carcass 1 comprises turns that delimit interstitial spaces 9 open towards the outside, of generally helical configuration, and internal interstices open towards the interior 10. Accordingly, and as is shown in FIGS. 3 to 5, which show partly in longitudinal section and to a larger scale a flexible pipe constituting one example of this other embodiment of the invention, there is disposed around the internal carcass 1 an elastomer intermediate layer comprising an elastomer band 8 disposed partly in the interstitial space 9 between the turns 11 of the internal carcass 1. The alternating succession of the external cylindrical parts 12a, 12b of the internal carcass and the exterior surfaces 13 of the elastomer band 8 constitute an approximately cylindrical surface on which the polymeric impervious sheath 2 bears continuously. This further avoids possible incipient fractures of the polymeric sheath 2 in the area and/or around the interstices 9 between the turns 11 of the internal carcass.

In the variant shown in FIG. 3, the elastomer band penetrates partially into the interstice 9 between two contiguous turns such as 11a and 11b or 11b and 11c. Relative to the ideal configuration, which would be a perfectly geometrical surface extending the exterior cylindrical parts 12a, 12b of the internal carcass 1, the exterior surface 13 of the elastomer band 8 has a slight irregularity which, in the case of FIG. 3, is in the form of cups with the convex side facing towards the interior of the pipe. In this case, as seen from the interior, the thermoplastic tubular layer 6 has a slight enlargement 14 the thickness b of which is preferably less than or equal to 0.3×a, a being the thickness of the cylindrical part of the tubular layer 6 around the surfaces 12a, 12b.

In the FIG. 4 variant, the elastomer band 8 also penetrates partly into the interstices 9 but its exterior surface 13 is slightly domed, merging progressively with the cylindrical surfaces 12a, 12b with a slight curvature.

In the FIG. 5 variant the elastomer band 8 penetrates totally into the interstices 9, its exterior surface 13 being cup-shaped with a slight curvature, as in the FIG. 3 variant.

In the various variants shown in FIGS. 2, 3, 4 and 5 the interior surface of the tubular layer 6 can generally be slightly corrugated at the location of the interstices 9, but its curvature must vary extremely gradually within the length of the tubular pipe and remain relatively small.

A detailed description of the possible geometrical characteristics of the variants shown in FIGS. 2 through 5 is given in application FR-A-94 02 765 the description of which relating to the configuration of the tubular layer 6, the internal layer 7 and the elastomer band 8 and to the deforming of the internal layer 8 is included in the present application.

An elastomer proper (normally in the vulcanized or crosslinked state) or an elastomer thermoplastic (TFE) can be used for the internal layer 7 shown in FIG. 2 or the band 8 from FIGS. 3 to 5. An elastomer is chosen with properties that are not degraded by the combination of the action of the various components present in the fluid transported (various hydrocarbons, water, etc.) and the temperature of this fluid during aging of the equipment subjected to such conditions. Interesting results are obtained with elastomers from the silicone group.

If the flexible tubular pipe includes a polymeric internal impervious sheath in the form of a continuous tubular layer 2 bearing directly on the carcass 1 (FIG. 1), long continuous lengths can be manufactured by the conventional extrusion-tubing process.

If the internal impervious sheath 2 includes a tubular layer 6 of a copolymer or terpolymer in accordance with the invention around an internal layer 7 of thermoplastic or elastomeric polymer as shown in FIG. 2, it is possible to extrude the internal layer 7 around the carcass 1, in particular by extrusion-tubing. If the polymer used in this way to make the layer 7 is an amorphous thermoplastic, a layer of almost regular thickness can advantageously be obtained. The tubular layer 6 can be extruded either by co-extruding the two layers 6 and 7 or by tandem extrusion, the layer 6 being extruded on-line at a certain distance downstream of the extruding machine used for the internal layer 7, or in a separate and subsequent operation.

If the internal impervious sheath 2 has an internal part consisting of an elastomer band 8 disposed in the exterior part of the interstices 9, or possibly in all of the volume of the interstices, in accordance with one or other of the variants shown in FIGS. 3 to 5, the band 8 may be applied by extrusion-filling, i.e. by passing the internal carcass through an enclosure filled with raw elastomer, the coated carcass leaving the enclosure via a calibrated circular opening closed by a seal, by roller coating, spraying, passage through a liquid bath or through a fluidized bath, these various coating processes being well known to the skilled person and for this reason not described in detail.

If the elastomer applied by one of the methods described above can be vulcanized, it can be applied in the raw state and then vulcanized, preferably before extruding the tubular layer 6.

Alternatively, the band 8 can be applied by helically winding a rod or a long band, this winding being effected so as to follow the helical line of the interstice 9 and to make the band 8 penetrate into the interstice to the required depth. Depending in particular on the mechanical properties of the elastomer, it is possible either to use a shaped rod the section of which corresponds to the configuration of the interstice or to use a simple section, for example circular section, rod made of elastomer sufficiently soft to deform and mate with the shape of the interstice 9.

An internal layer 7 (FIG. 2) can also be obtained by winding an elastomer band with the edges of the elastomer band practically touching and sufficiently soft for it to fill the interstices partially and for its external surface to have an almost continuous and smooth appearance, due to the effect of extruding the layer 6.

In all cases the thickness of the internal layer 7 is between 0.5 mm and 5 mm and preferably 3 mm. The polymeric sheath 2 has a thickness between 1 mm and 30 mm, preferably between 3 mm and 15 mm, for an inside diameter of the flexible metal carcass of between 20 mm and 600 mm (preferably between 50 mm and 400 mm) so as to withstand an internal pressure greater than 100 bars, normally in the order of several hundred bars and possibly reaching 700 bars to 1 000 bars, and also to resist high temperatures exceeding 130° C. and possibly up to 150° C. and more.

I claim:

1. Flexible tubular pipe of the type comprising at least, from the interior towards the exterior, an internal non-impervious metal carcass (1), an internal impervious polymeric sheath (2), a set of layers of reinforcement wires (3) (4), and an external protection sheath (5), the internal carcass (1) comprising at least one helically-wound profiled member with the turns clipped together so that at least the exterior surface of said internal carcass has interstices (9) between consecutive turns, said internal impervious polymeric sheath (2) being in the form of a continuous tubular layer and comprising a thermoplastic polymer part associating at least two fluoromonomers, characterized in that at least one of said fluoro monomers carries at least one alkoxy group, said thermoplastic polymer part being resistant to blistering at a temperature of at least 130° C.

2. Pipe according to claim 1 characterized in that the thermoplastic polymer constitutes the main part of the internal impervious sheath (1) and comprises at least one fluoromonomer and less than 50% of a perfluoromonomer carrying at least one alkoxy group.

3. Pipe according to claim 1 characterized in that the thermoplastic polymer associates a perfluoro(alkyl vinyl ether) with at least one fluoromonomer.

4. Pipe according to claim 3 characterized in that the perfluoro(alkyl vinyl ether) is perfluoro(propyl vinyl ether).

5. Pipe according to claim 3 characterized in that the perfluoro(alkyl vinyl ether) is perfluoro(ethyl vinyl ether).

6. Pipe according to claim 1 characterized in that the thermoplastic polymer associates at least 50% of tetrafluoroethylene (TFE) with at least one other fluoromonomer, at least one of said other fluoromonomers carrying at least one alkoxy group.

7. Pipe according to claim 1 characterized in that the thermoplastic polymer associates a cyclic fluoromonomer with at least one other fluoromonomer, at least one of said other fluoromonomers carrying at least one alkoxy group.

8. Pipe according to claim 1 characterized in that said thermoplastic polymer associates an anhydride fluoromonomer with at least one other fluoromonomer, at least one of said other fluoromonomers carrying at least one alkoxy group.

9. Pipe according to claim 1 characterized in that at least one of the fluoromonomers associated to constitute said thermoplastic polymer is a cyclic ether.

10. Pipe according to claim 6 characterized in that said thermoplastic polymer associates at least 70% of TFE with at least one other fluoromonomer, at least one of said other fluoromonomers carrying at least one alkoxy group.

11. Pipe according to claim 10 characterized in that the thermoplastic polymer is the type of material sold under the tradename PFA.

12. Pipe according to claim 1 characterized in that the thermoplastic polymer is a terpolymer associating two fluoromonomers one at least of which carries at least one alkoxy group with a relatively small proportion of a third fluoromonomer.

13. Pipe according to claim 12 characterized in that the third fluoromonomer is vinylidene fluoride (VF2).

14. Pipe according to claim 12 characterized in that the third fluoromonomer is chlorotrifluoroethylene (CTFE).

15. Pipe according to claim 12 characterized in that the terpolymer associates two fluoromonomers each carrying at least one alkoxy group with another fluoromonomer.

16. Pipe according to claim 1 characterized in that the thermoplastic polymer is semi-crystalline.

17. Pipe according to claim 1 characterized in that the thermoplastic polymer is crosslinked and has a crystalinity close to that corresponding to the non-crosslinked state, the crosslinking being operative in the amorphous phase.

18. Pipe according to claim 1 characterized in that the thermoplastic polymer is crosslinked and has a crystalinity lower than that of the non-crosslinked state.

19. Pipe according to claim 1 characterized in that the thermoplastic polymer has a bending stiffness greater than or equal to 50 MPa and preferably greater than or equal to 100 MPa for the maximal intended temperature of use, which temperature can be at least 130° C. and preferably at least 150° C., the bending stiffness being less than or equal to 2 500 MPa for the lowest intended ambient temperature, which temperature can be equal to or less than −20° C. and preferably to −40° C.

20. Pipe according to claim 1 characterized in that the internal impervious polymeric sheath (1) has an internal part (7) in a preferably amorphous polymer and resting on the internal carcass (1) inside said thermoplastic polymer main part.

21. Pipe according to claim 20 characterized in that the internal part constitutes a preferably continuous tubular layer made of an amorphous thermoplastic fluoropolymer having a high creep resistance, the thickness of said internal layer preferably being small, in the order of 0.5 mm to 3 mm.

22. Pipe according to claim 21 characterized in that the amorphous thermoplastic fluoropolymer is a copolymer or a terpolymer associating at least TFE and another fluoromonomer, preferably a cyclic fluoro ether or a fluoro aldehyde.

23. Pipe according to claim 20 characterized in that the internal part is made of a thermoplastic or non-thermoplastic elastomer having a relatively low bending stiffness compared to the thermoplastic polymer constituting the main part of the polymeric sheath, said internal part preferably being in the form of a band helically wound along the interstices (9) of the internal carcass (1) and penetrating at least partially into said interstices (9).

* * * * *